(12) United States Patent
Zhang et al.

(10) Patent No.: US 11,417,292 B2
(45) Date of Patent: Aug. 16, 2022

(54) SCREEN CALIBRATION METHOD, APPARATUS AND SYSTEM

(71) Applicant: ZTE CORPORATION, Guangdong (CN)

(72) Inventors: Xiaoliang Zhang, Guangdong (CN); Dingzhou Yang, Guangdong (CN); Jianping Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 143 days.

(21) Appl. No.: 16/976,754

(22) PCT Filed: Mar. 4, 2019

(86) PCT No.: PCT/CN2019/076794
§ 371 (c)(1),
(2) Date: Aug. 30, 2020

(87) PCT Pub. No.: WO2019/184656
PCT Pub. Date: Oct. 3, 2019

(65) Prior Publication Data
US 2021/0005159 A1    Jan. 7, 2021

(30) Foreign Application Priority Data

Mar. 30, 2018   (CN) .......................... 201810286991.2

(51) Int. Cl.
*G09G 5/02*        (2006.01)
(52) U.S. Cl.
CPC ....... *G09G 5/02* (2013.01); *G09G 2320/0666* (2013.01); *G09G 2320/0693* (2013.01); *G09G 2320/08* (2013.01)

(58) Field of Classification Search
CPC ............................................. G09G 2320/0666
See application file for complete search history.

(56) References Cited

U.S. PATENT DOCUMENTS

| 2004/0032534 | A1  | 2/2004  | Fujino |
| 2007/0285433 | A1  | 12/2007 | Wu |
| 2011/0248835 | A1* | 10/2011 | Speegle ............... H05B 47/185 340/12.32 |

(Continued)

FOREIGN PATENT DOCUMENTS

| CN | 101076128 A | 11/2007 |
| CN | 102097082 A | 6/2011 |
| CN | 103077691 A | 5/2013 |

(Continued)

OTHER PUBLICATIONS

China Patent Office, First Office Action dated Jun. 24, 2021 for application No. CN201810286991.2.

(Continued)

*Primary Examiner* — Gustavo Polo
(74) *Attorney, Agent, or Firm* — Li & Cai Intellectual Property (USA) Office

(57) ABSTRACT

Provided are a screen calibration method, apparatus and systems. The screen calibration method comprises steps of: acquiring the chromaticity coordinates of the display screen to be calibrated under different parameters, and storing the parameter corresponding to the closest chromaticity coordinate into a register to realize screen calibration.

10 Claims, 3 Drawing Sheets

```
┌─ 101
Change parameters input into a preset register of a first display screen and a preset
register of a second display screen, acquire chromaticity coordinates of the first display
screen under different parameters to obtain a first chromaticity coordinate set, and
acquire chromaticity coordinates of the second display screen under different
parameters to obtain a second chromaticity coordinate set, wherein the first display
screen and the second display screen display a same monochrome image
              │
              ▼           ┌─ 102
Acquire two chromaticity coordinates having the shortest distance from the first
chromaticity coordinate set and the second chromaticity coordinate set, respectively, set
the chromaticity coordinate, in the two chromaticity coordinates having the shortest
distance, belonging to the first chromaticity coordinate set as a first chromaticity
coordinate, and set the other chromaticity coordinate, in the two chromaticity
coordinates having the shortest distance, belonging to the second chromaticity
          coordinate set as a second chromaticity coordinate
              │
              ▼           ┌─ 103
Store a first parameter corresponding to the first chromaticity coordinate into the preset
register of the first display screen, and storie second parameter corresponding to the
second chromaticity coordinate into the preset register of the second display screen
```

(56) References Cited

U.S. PATENT DOCUMENTS

2015/0243251 A1    8/2015  Ohnishi

FOREIGN PATENT DOCUMENTS

| | | |
|---|---|---|
| CN | 104661006 A | 5/2015 |
| CN | 104766574 A | 7/2015 |
| CN | 104882098 A | 9/2015 |
| CN | 105161057 A | 12/2015 |
| CN | 105336286 A | 2/2016 |
| CN | 105609027 A | 5/2016 |
| CN | 108257572 A | 7/2018 |
| CN | 108648719 A | 10/2018 |
| EP | 3203463 A1 | 8/2017 |
| JP | 2016208327 A | 12/2016 |

OTHER PUBLICATIONS

European Patent Office, The extended European search report dated Sep. 27, 2021 for application No. EP19777468.0.
WIPO, International Search Report dated May 10, 2019.

\* cited by examiner

101

Change parameters input into a preset register of a first display screen and a preset register of a second display screen, acquire chromaticity coordinates of the first display screen under different parameters to obtain a first chromaticity coordinate set, and acquire chromaticity coordinates of the second display screen under different parameters to obtain a second chromaticity coordinate set, wherein the first display screen and the second display screen display a same monochrome image

102

Acquire two chromaticity coordinates having the shortest distance from the first chromaticity coordinate set and the second chromaticity coordinate set, respectively, set the chromaticity coordinate, in the two chromaticity coordinates having the shortest distance, belonging to the first chromaticity coordinate set as a first chromaticity coordinate, and set the other chromaticity coordinate, in the two chromaticity coordinates having the shortest distance, belonging to the second chromaticity coordinate set as a second chromaticity coordinate

103

Store a first parameter corresponding to the first chromaticity coordinate into the preset register of the first display screen, and storie second parameter corresponding to the second chromaticity coordinate into the preset register of the second display screen

FIG.1

SCREEN CALIBRATION METHOD, APPARATUS AND SYSTEM

The present disclosure claims priority to Chinese patent application No. 201810286991.2 filed on Mar. 30, 2018 in the China National Intellectual Property Administration, the entirety of which is incorporated herein by reference.

FIELD OF THE INVENTION

The present disclosure relates to the field of technology of electronics, and in particular, to a screen calibration method, apparatus and systems.

BACKGROUND

The color shown on the display screen is different even in the case of displaying pure white. The pure white colors shown on the display screens of terminals are different due to different manufacturers. Even for the same type of display screens produced by the same manufacturer, when displaying the same pure white images, the colors on some of screens are different in subjective view of human eyes. This is because the identification capability of human eyes is relatively high, such that a great number of colors can be identified.

When multiple display screens are spliced together to form a large display screen for displaying, the color difference between the two screens can be easily perceived by a user. Therefore, it is necessary to calibrate the color displayed on screens.

SUMMARY

In at least one embodiment of the present disclosure, there is provided a screen calibration method, apparatus and systems, to reduce the color differences displayed on the screens.

According to an embodiment of the present disclosure, there is provided a screen calibration method, including: changing parameters input into a preset register of a first display screen and a preset register of a second display screen, acquiring chromaticity coordinates of the first display screen under different parameters to obtain a first chromaticity coordinate set, and acquiring chromaticity coordinates of the second display screen under different parameters to obtain a second chromaticity coordinate set, wherein the first display screen and the second display screen display a same monochrome image; acquiring two chromaticity coordinates having the shortest distance from the first chromaticity coordinate set and the second chromaticity coordinate set, respectively, setting the chromaticity coordinate, in the two chromaticity coordinates having the shortest distance, belonging to the first chromaticity coordinate set as a first chromaticity coordinate, and setting the other chromaticity coordinate, in the two chromaticity coordinates having the shortest distance, belonging to the second chromaticity coordinate set as a second chromaticity coordinate; and storing a first parameter corresponding to the first chromaticity coordinate into the preset register of the first display screen, and storing a second parameter corresponding to the second chromaticity coordinate into the preset register of the second display screen.

According to another embodiment of the present disclosure, there is also provided a screen calibration system, including: a chromaticity acquisition device, a chromaticity adjusting module, and a chromaticity matching module, wherein: the chromaticity acquisition device is configured to acquire a chromaticity coordinate of a first display screen and send the chromaticity coordinate of the first display screen to the chromaticity adjusting module and acquire a chromaticity coordinate of a second display screen and send the chromaticity coordinate of the second display screen to the chromaticity adjusting module after receiving an instruction sent from the chromaticity adjusting module; the chromaticity adjusting module is configured to input different parameters into a preset register of the first display screen and a preset register of the second display screen sequentially, send an instruction for displaying a same monochrome image to the first display screen and the second display screen, send an instruction for acquiring the chromaticity coordinate to the chromaticity acquisition device, receive the chromaticity coordinate of the first display screen and the chromaticity coordinate of the second display screen sent from the chromaticity acquisition device, obtain a first chromaticity coordinates set including the chromaticity coordinates of the first display screen under the different parameters and a second chromaticity coordinates set including the chromaticity coordinates of the second display screen under the different parameters; and the chromaticity matching module is configured to obtain two chromaticity coordinates having the shortest distance from the first chromaticity coordinate set and the second chromaticity coordinate set, respectively; set the chromaticity coordinate, in the two chromaticity coordinates having the shortest distance, belonging to the first chromaticity coordinate set as a first chromaticity coordinate, and set the other chromaticity coordinate, in the two chromaticity coordinates having the shortest distance, belonging to the second chromaticity coordinate set as a second chromaticity coordinate; store a first parameter corresponding to the first chromaticity coordinate into the preset register of the first display screen, and store a second parameter corresponding to the second chromaticity coordinate into the preset register of the second display screen.

Additional features and advantages of the present disclosure will be set forth below in the description, and in part will be obvious from the description, or may be understood by implementing the present disclosure. The objectives and other advantages of the disclosure may be realized and attained by the structures particularly pointed out in the description, appended claims and the accompanying figures.

BRIEF DESCRIPTION OF THE DRAWINGS

The accompanying figures herein are intended to provide a further understanding of the disclosure and form a part of the description. And the accompanying figures are used to explain the disclosure in conjunction with the illustrative embodiments of the present disclosure and do not constitute an undue limitation. In the drawings:

FIG. 1 is a flowchart of a screen calibration method according to an embodiment of the disclosure;

DETAILED DESCRIPTION OF THE EMBODIMENTS

Figure 2:
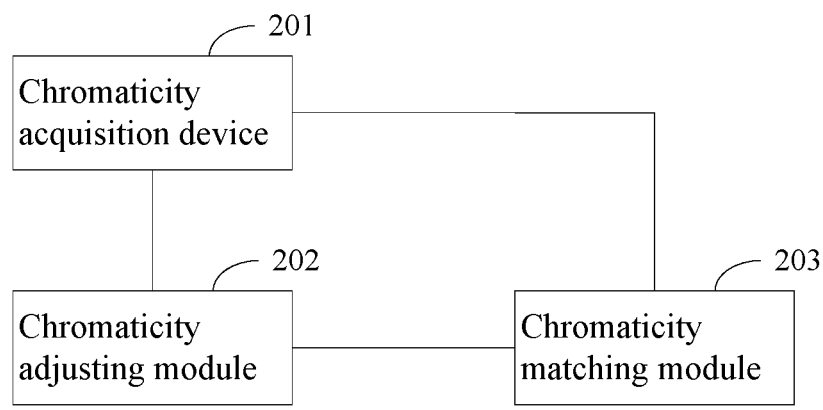
FIG. 2 is a schematic diagram of a screen calibration system according to an embodiment of the disclosure.

Hereinafter, embodiments of the present disclosure will be described in detail with reference to drawings. It should be noted that the embodiments in the present disclosure and the features in the embodiments can be mutually combined without any conflict.

The steps shown in the flowcharts can be executed in a computer system such as a set of computer-executable instructions. And, though logical sequences are shown in the flowchart, in certain cases, the shown or described steps can be performed in different sequences from the sequences shown herein.

At present, there are a few terminals commercially available on the market that can splice multiple display screens into a large screen for displaying. Usually, the unaided eyes of a user judge whether the color difference between two or more display screens is small enough to combine together. The judgment manner by means of the unaided eyes has the following disadvantages. One of disadvantages is that it substantially relies on subjective perception. Each person has a different observation ability of the unaided eyes. There might be a big problem if a visually impaired individual makes judgment. Another disadvantage is that visual fatigue of the eyes will appear after a long period of time for observation with the unaided eyes, which may leads a problem of reduced judgment.

Also, a multi-screen terminal or a terminal having a large display formed by splicing a plurality of display screens may adjust the white balance by using the gamma calibration scheme of the display screens to set a white chromaticity coordinate value. All the screens are calibrated nearby the target value. Due to the accuracy of the calibration equipment or the deviation after calibration to the target value, some are at the coordinates of the target value and some are at the right side of the coordinates of the target value, so that the white balance between different screens still has a large difference. In this disclosure, the calibration is performed using different color temperatures caused by different parameters of a color temperature register or a voltage register in an integrated circuit (IC) of a liquid crystal display (LCD).

Embodiment 1

As shown in FIG. 1, in an embodiment of the present disclosure, there is provided a screen calibration method, including step 101, step 102, and step 103.

In step 101, changing parameters input into a preset register of a first display screen and a preset register of a second display screen, acquiring chromaticity coordinates of the first display screen under different parameters to obtain a first chromaticity coordinate set, and acquiring chromaticity coordinates of the second display screen under different parameters to obtain a second chromaticity coordinate set, wherein the first display screen and the second display screen display the same monochrome image.

In step 102, acquiring two chromaticity coordinates having the shortest distance from the first chromaticity coordinate set and the second chromaticity coordinate set, respectively, setting the chromaticity coordinate, in the two chromaticity coordinates having the shortest distance, belonging to the first chromaticity coordinate set as a first chromaticity coordinate, and setting the other chromaticity coordinate, in the two chromaticity coordinates having the shortest distance, belonging to the second chromaticity coordinate set as a second chromaticity coordinate.

In step 103, storing a first parameter corresponding to the first chromaticity coordinate into the preset register of the first display screen, and storing a second parameter corresponding to the second chromaticity coordinate into the preset register of the second display screen.

Herein, the first parameter corresponding to the first chromaticity coordinate means: when the register is assigned to the first parameter, the acquired chromaticity coordinate is the first chromaticity coordinate; the second parameter corresponding to the second chromaticity coordinate means: when the register is assigned to the second parameter, the acquired chromaticity coordinate is the second chromaticity coordinates.

The naked eyes are not required in the calibration method according to this embodiment, thereby avoiding unobjective judgment. In addition, the problem in the related art that the calibration to the target value is affected by accuracy can be eliminated.

Herein, in step 102, for any two chromaticity coordinates $(xa_1, ya_1)$ and $(xb_2, yb_2)$, the distance there can be determined by calculating $(xa_1-xb_2)^2+(ya_1-yb_2)^2$. The distance calculation method here is merely exemplary, and other calculation methods may also be employed.

In an embodiment, the preset register is a color temperature register or a voltage register corresponding to a gamma parameter.

In an embodiment, the step of acquiring chromaticity coordinates of the first display screen under different parameters to obtain the first chromaticity coordinate set comprises: acquiring chromaticity coordinates of the first display screen under all parameters within a parameter range supported by the first display screen to obtain the first chromaticity coordinate set. For example, in the case that the first display screen supports 256 register values, the 256 register values are input into the color temperature register, respectively, to obtain the first chromaticity coordinate set containing 256 chromaticity coordinates. As another example, in the case that the first display screen supports 100 register values, the 100 register values are input into the voltage register, respectively, to obtain the first chromaticity coordinate set containing 100 chromaticity coordinates. It should be noted that it is also possible to take a subset of the register values. For example, 128 register values are input into the color temperature register to obtain the first chromaticity coordinate set containing 128 chromaticity coordinates. As another example, 50 register values are input into the voltage register to obtain the first chromaticity coordinate set containing 50 chromaticity coordinates.

The step of acquiring chromaticity coordinates of the second display screen under different parameters to obtain the second chromaticity coordinate set comprises: acquiring chromaticity coordinates of the second display screen under all parameters within a parameter range supported by the second display screen to obtain the second chromaticity coordinate set. For example, in the case that the second display screen supports 256 register values, the 256 register values are input into the color temperature register, respectively, to obtain the second chromaticity coordinate set containing 256 chromaticity coordinates. As another example, in the case that the second display screen supports 100 register values, the 100 register values are input into the voltage register, respectively, to obtain the second chromaticity coordinate set containing 100 chromaticity coordinates. It should be noted that it is also possible to take a subset of the register values. For example, 128 register values are input into the color temperature register to obtain the second chromaticity coordinate set containing 128 chromaticity coordinates. As another example, 50 register values are input into the voltage register to obtain the second chromaticity coordinate set containing 50 chromaticity coordinates.

In an embodiment, the same monochrome image is a white image. In other embodiments, it may also be possible to use other colors as the monochrome image, such as a red image. However, the color difference between the two screens can be easily identified when the pure white image is applied to the display screens. Therefore, in this embodiment, the pure white image is selected to calibrate the colors displayed on the two screens under the pure white image, so that the pure white images shown on the two display screens approach to each other.

In an embodiment, the step of storing the first parameter corresponding to the first chromaticity coordinate into the preset register of the first display screen and storing the second parameter corresponding to the second chromaticity coordinate into the preset register of the second display screen further includes:

When a distance between the first chromaticity coordinate and the second chromaticity coordinate is less than a first preset threshold, the first parameter corresponding to the first chromaticity coordinate is stored into the preset register of the first display screen, and the second parameter corresponding to the second chromaticity coordinate is storied into the preset register of the second display screen.

Alternatively, the first chromaticity coordinate includes a first abscissa and a first ordinate, and the second chromaticity coordinate includes a second abscissa and a second ordinate. When a distance between the first abscissa and the second abscissa is less than a second preset threshold and a distance between the first ordinate and the second ordinate is less than a third preset threshold, the first parameter corresponding to the first chromaticity coordinate is stored into the preset register of the first display screen and the second parameter corresponding to the second chromaticity coordinates is stored into the preset register of the second display screen.

In an embodiment, the method further includes:

When a distance between the first chromaticity coordinate and the second chromaticity coordinate is greater than or equal to a first preset threshold, indication information that the color difference between the first display screen and the second display screen is not matched is output.

Alternatively, the first chromaticity coordinate includes a first abscissa and a first ordinate, and the second chromaticity coordinate includes a second abscissa and a second ordinate. When a distance between the first abscissa and the second abscissa is greater than or equal to a second preset threshold value, or a distance between the first ordinate and the second ordinate is greater than or equal to a third preset threshold value, indication information that the color difference of the first display screen and the second display screen is not match is output. The method may be used for screening two display screens as the display screens of a dual-screen or multi-screen terminal. Also, the method may be used for evaluating whether the dual-screen or multi-screen terminal is qualified (whether the color difference meets the requirement). The first preset threshold, the second preset threshold, and the third preset threshold may be set as needed, for example, 0.005.

It should be noted that the first display screen and the second display screen may be two display screens of a dual-screen or multi-screen terminal, or may be two independent display screens.

Compared with the related art, the embodiment of the disclosure can obtain the chromaticity coordinates having the shortest distance by comparing the chromaticity coordinates of the two display screens, and the calibration is carried out according to the chromaticity coordinates having the shortest distance, so that the color difference of the screens in display can be reduced. The calibration method can avoid the unobjective of unaided eyes and the problem in the related art that the calibration to the target value is affected by the accuracy.

Embodiment 2

As shown in FIG. 2, in an embodiment of the present disclosure, there is provided a screen calibration system, including: a chromaticity acquisition device 201, a chromaticity adjusting module 202, and a chromaticity matching module 203.

The chromaticity acquisition device 201 is configured to, after receiving an instruction sent from the chromaticity adjusting module, acquire a chromaticity coordinate of a first display screen and send the acquired chromaticity coordinates of the first display screen to the chromaticity adjusting module 202 and acquire a chromaticity coordinate of a second display screen and send the acquired chromaticity coordinate of the second display screen to the chromaticity adjusting module 202.

The chromaticity adjusting module 202 is configured to sequentially input different parameters into a preset register of the first display screen and a preset register of the second display screen, send an instruction for displaying a same monochrome image to the first display screen and the second display screen, send an instruction for acquiring the chromaticity coordinate to the chromaticity acquisition device 201, receive the chromaticity coordinate of the first display screen and the chromaticity coordinate of the second display screen sent from the chromaticity acquisition device 201, and obtain a first chromaticity coordinate set including the chromaticity coordinates of the first display screen under the different parameters and a second chromaticity coordinate set including the chromaticity coordinates of the second display screen under the different parameters.

The chromaticity matching module 203 is configured to obtain two chromaticity coordinates having the shortest distance from the first chromaticity coordinate set and the second chromaticity coordinate set, respectively; set the chromaticity coordinate, in the two chromaticity coordinates having the shortest distance, belonging to the first chromaticity coordinate set as a first chromaticity coordinate, set the other chromaticity coordinate, in the two chromaticity coordinates having the shortest distance, belonging to the second chromaticity coordinate set as a second chromaticity coordinate; store a first parameter corresponding to the first chromaticity coordinate into the preset register of the first display screen, and store a second parameter corresponding to the second chromaticity coordinate into the preset register of the second display screen.

Here, the chromaticity acquisition device 201 is a device for acquiring chromaticity coordinates of the display screens, and may be a device such as CA-310 produced by konica. The acquisition accuracy is related to luminance, so that the first display screen and the second display screen can be displayed with the maximum luminance. Of course, the present disclosure is not limited thereto, and other luminance may be used for display.

In an embodiment, the chromaticity adjusting module 202 sequentially inputs the different parameters into the preset register of the first display screen and the preset register of the second display screen, which includes: inputting all parameters within a parameter range supported by the first display screen into the preset register of the first display screen sequentially; and inputting all parameters within the parameter range supported by the second display screen to the preset register of the second display screen sequentially.

In an embodiment, the chromaticity matching module 203 is further configured to: when a distance between the first chromaticity coordinate and the second chromaticity coordinate is greater than or equal to a first preset threshold, output indication information that the color difference between the first display screen and the second display screen is not matched, or when a distance between a first abscissa included in the first chromaticity coordinate and a second abscissa included in the second chromaticity coordinate is greater than or equal to a second preset threshold value, or a distance between a first ordinate included in the first chromaticity coordinate and a second ordinate included in the second chromaticity coordinate is greater than or equal to a third preset threshold value, output indication information that the color difference between the first display screen and the second display screen is not matched, wherein the first chromaticity coordinate including the first abscissa and the first ordinate, the second chromaticity coordinate including the second abscissa and the second ordinate.

The disclosure will be further illustrated by the following embodiments.

Embodiment 3

A color temperature register, which is a specific register in the LCD IC, is configured to adjust the color temperature of the LCD display screen, and the color displayed on the screen can be adjusted from warm (yellowish) to cold (bluish). Taking an IC as example, a default value of this register is 00 (hexadecimal), wherein 00 to 7F (hexadecimal) corresponds to an adjustment from a typical value to a colder value, and FF to 80 (hexadecimal) corresponds to an adjustment from a typical value to a warmer value. In the embodiment, the color temperature register is used for calibrating the display screen.

Taking a dual-screen terminal as an example, the dual-screen terminal has two screens with the same specification parameters, which are called as a first display screen and a second display screen, respectively.

256 parameters from 00 to 7F, and from FF to 80 are input to a color temperature register of the first display screen, respectively, to measure chromaticity coordinate values $(xa_n, ya_n)$ of the first display screen in the Commission Internationale de L'Eclairage (CIE) coordinate system, wherein n is ranged from 1 to 256. In the process, the first display screen displays a white image.

256 parameters from 00 to 7F, and from FF to 80 are input to a color temperature register of the second display screen, respectively, to measure chromaticity coordinate values $(xb_m, yb_m)$ of the second display screen, wherein m is ranged from 1 to 256. In the process, the second display screen displays the same white image as the first display screen.

$(xa_n-xb_m)^2+(ya_n-yb_m)^2$ is calculated, wherein n is from 1 to 256, and m is from 1 to 256. It is assumed the values of n and m obtained when $(xa_n-xb_m)^2+(ya_n-yb_m)^2$ has a minimum value are n 'and m'. That is, the two chromaticity coordinates having the shortest distance are found, which are $(xa_{n'}, ya_{n'})$ and $(xb_{m'}, yb_{m'})$ in this embodiment.

Whether the value of $|xa_{n'}-xb_{m'}|$ is less than a second preset threshold (for example, 0.005) is judged, and whether the value of $|ya_{n'}-yb_{m'}|$ is less than a third preset threshold (for example, 0.005) is judged. If so, the color difference of the display screens is acceptable, then a parameter corresponding to the $(xa_{n'}, ya_{n'})$ is written into the color temperature register of the first display screen, and a parameter corresponding to the $(xb_{m'}, yb_{m'})$ is written into the color temperature register of the second display screen. Subsequently, the value in the color temperature register of the first display screen is called when the first display screen is displaying, and the value in the color temperature register of the second display screen is called when the second display screen is displaying. In an embodiment, the color temperature register is, for example, an 84H register, and n' and m' are written into the 84H register of the first display screen and the 84H register of the second display screen, respectively. The value of the 84H register of the first display screen is called when the first display screen is displaying, and the value of the 84H register of the second display screen is called when the second display screen is displaying.

If $|xa_{n'}-xb_{m'}|$ is greater than or equal to a second preset threshold value, or $|ya_{n'}-yb_{m'}|$ is greater than or equal to a third preset threshold value, then indication information that the color difference of the first display screen and the second display screen is not matched will be output.

Of course, it may also be directly determined whether $(xa_{n'}-xb_{m'})^2+(ya_{n'}-yb_{m'})^2$ is smaller than the first preset threshold. If so, the color difference of the display screen is accepted, then the parameter corresponding to $(xa_{n'}, ya_{n'})$ is written into the color temperature register of the first display screen, and the parameter corresponding to $(xb_{m'}, yb_{m'})$ is written into the color temperature register of the second display screen. If $(xa_{n'}-xb_{m'})^2+(ya_{n'}-yb_{m'})^2$ is greater than or equal to a first preset threshold value, the indication information that the color difference of the first display screen and the second display screen is not matched will be output. The method can be used for pairing the display screens and combining the display screens with the color difference meeting the requirement.

Embodiment 4

GVDDP and GVDDN are voltages for adjusting Gamma parameters of the display screen, which are controlled by values of the voltage register. Each value of the voltage register corresponds to a value of GVDDP and GVDDN, and the value of GVDDP and GVDDN can be changed in accordance with the value of the voltage register. GVDDP and GVDDN are a pair of positive and negative voltages having an equal magnitude.

In this embodiment, the voltage of GVDDP is set to vary from 4V to 5V. When it is varied from small to large voltage, the voltage can be set from 4.01V, 4.02V up to 5V, for a total of 100 sets of voltage. Accordingly, the white image displayed on the display screen varies from bluish to yellowish. Taking a certain type of a display screen IC as example, a 97H register corresponds to the voltage of GVDDP, and a 98H register corresponds to the voltage of GVDDN.

Taking a dual-screen mobile phone as an example, the dual-screen mobile phone has two screens with the same specification parameters, which are called as a first display screen and a second display screen, respectively.

The value of the 97H register is Hexadecimal, and has a total of 100 (decimal) values from D7 (Hexadecimal) to 74 (Hexadecimal), which correspond to the white image displayed from warm tone to cool tone.

The value of the 98H register is Hexadecimal, and has a total of 100 (decimal) values from D7 (Hexadecimal) to 74

(Hexadecimal), which correspond to the white image displayed from warm tone to cool tone.

The 97H register and 98H register are written by the same parameter values.

The values of the voltage registers (97H and 98H registers) are changed so that GVDDN is changed from 4V to 5V. A chromaticity coordinate value of the white image displayed on the first display screen in the CIE coordinate system: $(xa_i, ya_i)$ is measured, wherein i is from 1 to 100. A chromaticity coordinate value of the white image displayed on the second display screen in the CIE coordinate system: $(xb_j, yb_j)$ is measured, wherein j is from 1 to 100.

$(xa_i-xb_j)^2+(ya_i-yb_j)^2$ is calculated, wherein i is from 1 to 100, and j is from 1 to 100. It is assumed the values of i and j obtained when $(xa_i-xb_j)^2+(ya_i-yb_j)^2$ has a minimum value are i' and j'. That is, the two chromaticity coordinates having the shortest distance are found, which are $(xa_{i'}, ya_{i'})$ and $(xb_{j'}, yb_{j'})$ in this embodiment.

Whether the value of $|xa_{i'}-xb_{j'}|$ is less than a second preset threshold (for example, 0.005) is judged, and whether the value of $|ya_{i'}-yb_{j'}|$ is less than a third preset threshold (for example, 0.005) is judged If so, the color difference of the display screens is acceptable, then parameters corresponding to the $(xa_{i'}, ya_{i'})$ and $(xb_{j'}, y_{bj'})$ are written into a voltage register of the first display screen and a voltage register of the second display screen, respectively. Subsequently, the value in the voltage register of the first display screen is called when the first display screen is displaying, and the value in the voltage register of the second display screen is called when the second display screen is displaying. If $|xa_{i'}-xb_{j'}|$ is greater than or equal to the second preset threshold value, or $|ya_{i'}-yb_{j'}|$ is greater than or equal to the third preset threshold value, then indication information that the color difference of the first display screen and the second display screen is not matched will be output.

Of course, it may also be directly determined whether $(xa_{i'}-xb_{j'})^2+(ya_{i'}-yb_{j'})^2$ is less than the first preset threshold. If so, the color difference of the display screen is accepted, and then i' and j' is written to the voltage register of the first display screen and the voltage register of the second display screen, respectively. If $(xa_{i'}-xb_{j'})^2+(ya_{i'}-yb_{j'})^2$ is greater than or equal to the first preset threshold value, the indication information that the color difference of the first display screen and the second display screen is not matched will be output. The method can be used for pairing the display screens and combining the display screens with the color difference meeting the requirement. Or, the method can be used for judging whether the two display screens of the dual-screen terminal are matched.

Embodiment 5

Figure 3:
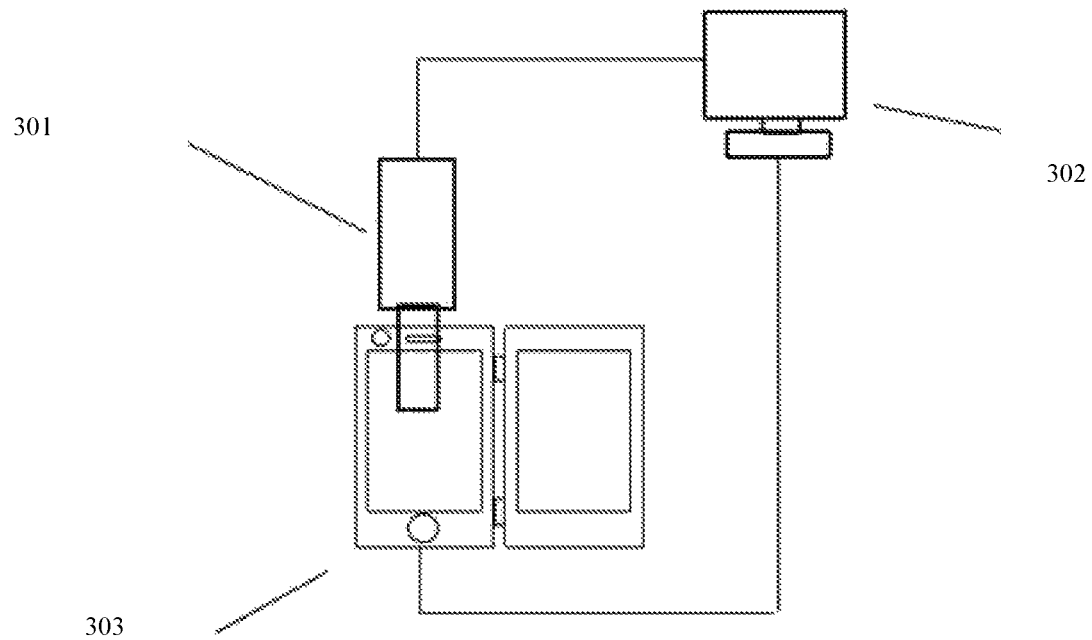
FIG. 3 is a schematic diagram of a screen calibration system according to an embodiment of the disclosure.

As shown in FIG. 3, an embodiment of the present disclosure provides a screen calibration system. The screen calibration system including a dual-screen terminal 301, a chromaticity acquisition device 302, and a control device 303 (such as a computer), wherein the control device 303 includes a chromaticity adjusting module 202 and a chromaticity matching module 203. It should be noted that, in another embodiment, the control device 303 may be omitted, and the chromaticity adjusting module 202 and the chromaticity matching module 203 are directly disposed in the dual-screen terminal 301.

Figure 4:
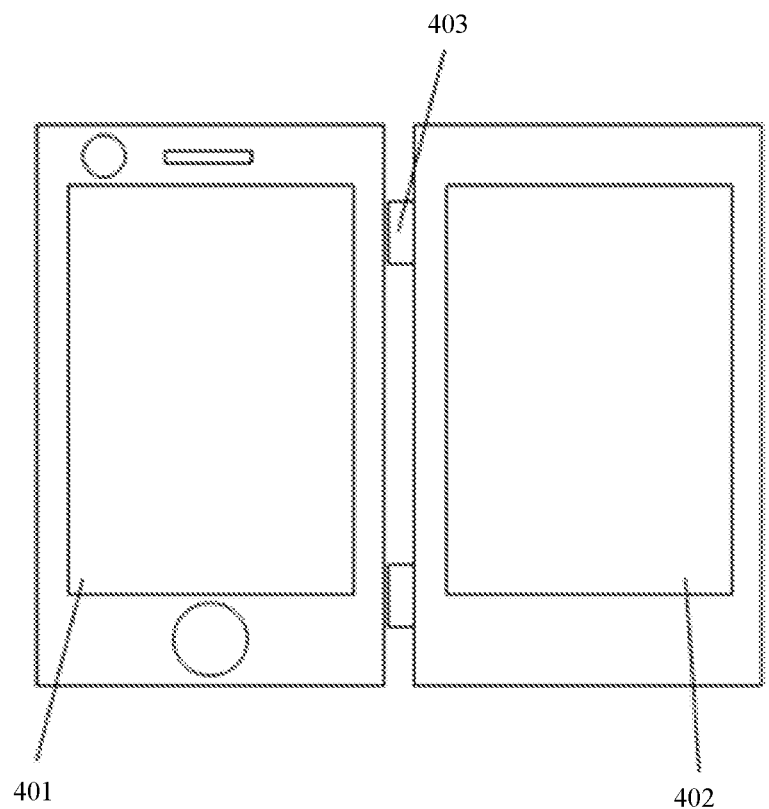
FIG. 4 is a schematic diagram of a dual-screen terminal according to an embodiment of the disclosure.

As shown in FIG. 4, the dual-screen terminal 301 has two display screens with the same size and specification. The two display screens, which are a first display screen 401 and a second display screen 402, respectively, are placed side by side after the dual-screen terminal is unfolded. The two display screens are connected by a rotating shaft 403. As such, the two display screens (i.e., the first display screen 401 and the second display screen 402) can be folded back to back and unfolded side by side by rotating the rotating shaft 403.

The chromaticity acquisition device 302 is configured to, after receiving an instruction sent from the chromaticity adjusting module, acquire chromaticity coordinates of the first display screen and send the chromaticity coordinates of the first display screen to the control device 303 (for example, the chromaticity adjusting module 202); and acquire the chromaticity coordinate of the second display screen and send the chromaticity coordinate of the second display screen to the control device 303 (for example, the chromaticity adjusting module 202).

The chromaticity adjusting module 202 is configured to sequentially input different parameters to a preset register of the first display screen and a preset register of the second display screen, send an instruction for displaying a same monochrome image to the first display screen and the second display screen, send an instruction for acquiring chromaticity coordinates to the chromaticity acquisition device, receive the chromaticity coordinates of the first display screen and the chromaticity coordinates of the second display screen sent from the chromaticity acquisition device to obtain a first chromaticity coordinate set formed by the chromaticity coordinates of the first display screen under different parameters and a second chromaticity coordinate set formed by the chromaticity coordinates of the second display screen under different parameters. For example, 256 parameters are input to a color temperature register to obtain a first chromaticity coordinate set containing 256 chromaticity coordinates and a second chromaticity coordinate set containing 256 chromaticity coordinates. Or, 100 parameters are input to a voltage register to obtain a first chromaticity coordinate set containing 100 chromaticity coordinates and a second chromaticity coordinate set containing 100 chromaticity coordinates.

The chromaticity matching module 203 is configured to obtain two closest chromaticity coordinates from the first chromaticity coordinate set and the second chromaticity coordinate set, as a first chromaticity coordinate and a second chromaticity coordinate, respectively; store a first parameter corresponding to the first chromaticity coordinate into the preset register of the first display screen, and store a second parameter corresponding to the second chromaticity coordinate into the preset register of the second display screen. For example, the first parameter and the second parameter are sent to the dual-screen terminal 301, and the dual-screen terminal 301 writes the first parameter and the second parameter into corresponding display screen IC registers, respectively, such that the first display screen and the second display screen execute the parameters when being displayed.

Figure 5:
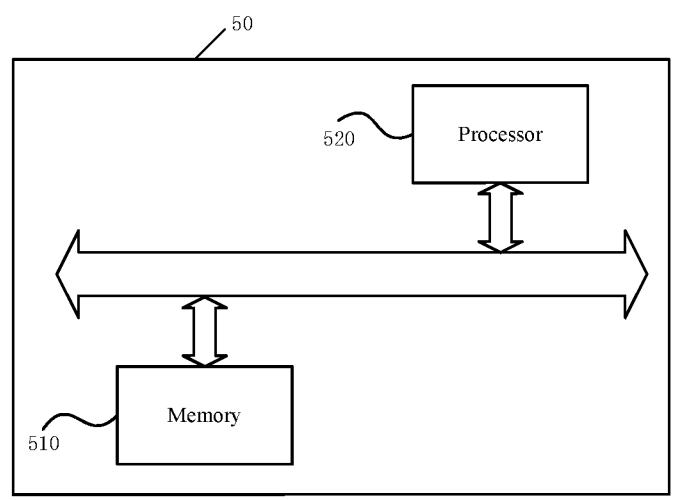
FIG. 5 is a block diagram of a screen calibration apparatus according to an embodiment of the disclosure.

As shown in FIG. 5, an embodiment of the present disclosure provides a screen calibration apparatus 50. The screen calibration apparatus 50 includes a memory 510 and a processor 520, wherein the memory 510 stores a program, which when being read and executed by the processor 520, implements the screen calibration method according to any one of embodiments as set forth.

An embodiment of the present disclosure provides a computer-readable storage medium storing at least one program, which are executable by at least one processor to implement the screen calibration method of any one of embodiments as set forth.

The computer-readable storage medium may include various media capable of storing program codes, such as a USB disk, a Read-Only Memory (ROM), a Random Access Memory (RAM), a removable hard disk, a magnetic disk, or an optical disk.

The invention claimed is:

1. A screen calibration method, comprising:
changing parameters input into a preset register of a first display screen and a preset register of a second display screen, acquiring chromaticity coordinates of the first display screen under different parameters to obtain a first chromaticity coordinate set, and acquiring chromaticity coordinates of the second display screen under different parameters to obtain a second chromaticity coordinate set, wherein the first display screen and the second display screen display a same monochrome image;
acquiring two chromaticity coordinates having the shortest distance from the first chromaticity coordinate set and the second chromaticity coordinate set, respectively, setting the chromaticity coordinate, in the two chromaticity coordinates having the shortest distance, belonging to the first chromaticity coordinate set as a first chromaticity coordinate, and setting the other chromaticity coordinate, in the two chromaticity coordinates having the shortest distance, belonging to the second chromaticity coordinate set as a second chromaticity coordinate; and
storing a first parameter corresponding to the first chromaticity coordinate into the preset register of the first display screen, and storing a second parameter corresponding to the second chromaticity coordinate into the preset register of the second display screen;
wherein the acquiring chromaticity coordinates of the first display screen under different parameters to obtain the first chromaticity coordinate set comprises:
acquiring chromaticity coordinates of the first display screen under all parameters within a parameter range supported by the first display screen to obtain the first chromaticity coordinate set; and
wherein the acquiring chromaticity coordinates of the second display screen under different parameters to obtain the second chromaticity coordinate set comprises:
acquiring chromaticity coordinates of the second display screen under all parameters within a parameter range supported by the second display screen to obtain the second chromaticity coordinate set.

2. The method according to claim 1, wherein the preset register is a color temperature register or a voltage register corresponding to a gamma parameter.

3. The method according to claim 1, wherein the same monochrome image is a white image.

4. The method according to claim 1, wherein the step of storing the first parameter corresponding to the first chromaticity coordinate into the preset register of the first display screen and storing the second parameter corresponding to the second chromaticity coordinate into the preset register of the second display screen comprises:
storing the first parameter corresponding to the first chromaticity coordinate into the preset register of the first display screen and storing the second parameter corresponding to the second chromaticity coordinate into the preset register of the second display screen, based on determining that a distance between the first chromaticity coordinate and the second chromaticity coordinate is less than a first preset threshold; or
storing the first parameter corresponding to the first chromaticity coordinate into the preset register of the first display screen and storing the second parameter corresponding to the second chromaticity coordinate into the preset register of the second display screen, based on determining a distance between a first abscissa and a second abscissa is less than a second preset threshold and a distance between a first ordinate and a second ordinate is less than a third preset threshold, wherein the first chromaticity coordinate includes the first abscissa and the first ordinate and the second chromaticity coordinate includes the second abscissa and the second ordinate.

5. The method according to claim 1, further comprising:
outputting indication information that the first display screen and the second display screen are not matched, based on determining that a distance between the first chromaticity coordinate and the second chromaticity coordinate is greater than or equal to a first preset threshold; or
outputting indication information that the first display screen and the second display screen are not matched, based on determining that a distance between a first abscissa and a second abscissa is greater than or equal to a second preset threshold or a distance between a first ordinate and a second ordinate is greater than or equal to a third preset threshold, wherein the first chromaticity coordinate includes the first abscissa and the first ordinate and the second chromaticity coordinate includes the second abscissa and the second ordinate.

6. A screen calibration apparatus, comprising a memory and a processor, wherein the memory stores a program which when read and executed by the processor, implements the screen calibration method according to claim 1.

7. A screen calibration system, comprising: a chromaticity acquisition device, a chromaticity adjusting module, and a chromaticity matching module, wherein:
the chromaticity acquisition device is configured to acquire a chromaticity coordinate of a first display screen and send the chromaticity coordinate of the first display screen to the chromaticity adjusting module and acquire a chromaticity coordinate of a second display screen and send the chromaticity coordinate of the second display screen to the chromaticity adjusting module after receiving an instruction sent from the chromaticity adjusting module;
the chromaticity adjusting module is configured to input different parameters into a preset register of the first display screen and a preset register of the second display screen sequentially, send an instruction for displaying a same monochrome image to the first display screen and the second display screen, send an instruction for acquiring the chromaticity coordinate to the chromaticity acquisition device, receive the chromaticity coordinate of the first display screen and the chromaticity coordinate of the second display screen sent from the chromaticity acquisition device, obtain a first chromaticity coordinates set including the chromaticity coordinates of the first display screen under the different parameters and a second chromaticity coordinates set including the chromaticity coordinates of the second display screen under the different parameters; and
the chromaticity matching module is configured to obtain two chromaticity coordinates having the shortest distance from the first chromaticity coordinate set and the second chromaticity coordinate set, respectively; set the chromaticity coordinate, in the two chromaticity coordinates having the shortest distance, belonging to the first chromaticity coordinate set as a first chromaticity coordinate, and set the other chromaticity coordinate, in the two chromaticity coordinates having the shortest distance, belonging to the second chromaticity coordinate set as a second chromaticity coordinate; store a first parameter corresponding to the first chromaticity coordinate into the preset register of the first display screen, and store a second parameter corresponding to the second chromaticity coordinate into the preset register of the second display screen;

wherein the chromaticity acquisition device is further configured to:

acquire chromaticity coordinates of the first display screen under all parameters within a parameter range supported by the first display screen to obtain the first chromaticity coordinate set; and acquire chromaticity coordinates of the second display screen under all parameters within a parameter range supported by the second display screen to obtain the second chromaticity coordinate set.

8. The system according to claim 7, wherein the chromaticity adjusting module is configured to input the different parameters to a preset register of the first display screen and a preset register of the second display screen sequentially, which comprises:

inputting all the parameters within the parameter range supported by the first display screen into the preset register of the first display screen sequentially; and inputting all the parameters within the parameter range supported by the second display screen into the preset register of the second display screen sequentially.

9. The system according to claim 7, wherein the chromaticity matching module is further configured to:

output indication information that the first display screen and the second display screen are not matched based on determining that a distance between the first chromaticity coordinate and the second chromaticity coordinate is greater than or equal to a first preset threshold; or output indication information that the first display screen and the second display screen are not matched based on determining that a distance between a first abscissa included by the first chromaticity coordinate and a second abscissa included by the second chromaticity coordinate is greater than or equal to a second preset threshold, or a distance between a first ordinate included by the first chromaticity coordinate and a second ordinate included by the second chromaticity coordinate is greater than or equal to a third preset threshold.

10. The system according to claim 8, wherein the chromaticity matching module is further configured to:

output indication information that the first display screen and the second display screen are not matched based on determining that a distance between the first chromaticity coordinate and the second chromaticity coordinate is greater than or equal to a first preset threshold; or output indication information that the first display screen and the second display screen are not matched based on determining that a distance between a first abscissa included by the first chromaticity coordinate and a second abscissa included by the second chromaticity coordinate is greater than or equal to a second preset threshold, or a distance between a first ordinate included by the first chromaticity coordinate and a second ordinate included by the second chromaticity coordinate is greater than or equal to a third preset threshold.

* * * * *